Aug. 20, 1946.  W. FERRIS ET AL  2,406,138
HYDRODYNAMIC MACHINE
Filed Jan. 14, 1942  6 Sheets-Sheet 1
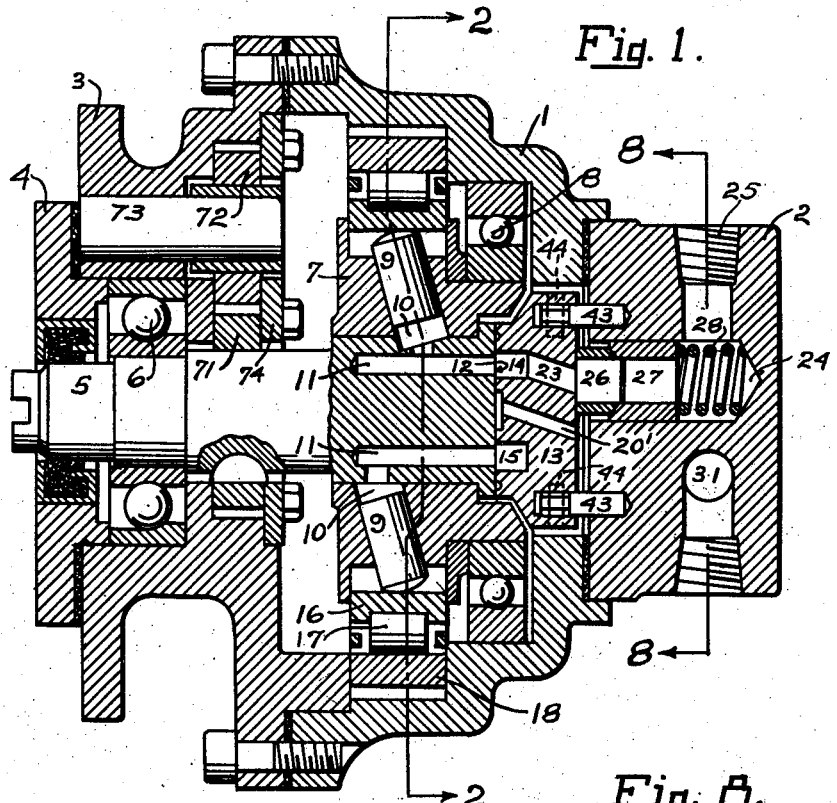
Fig. 1.
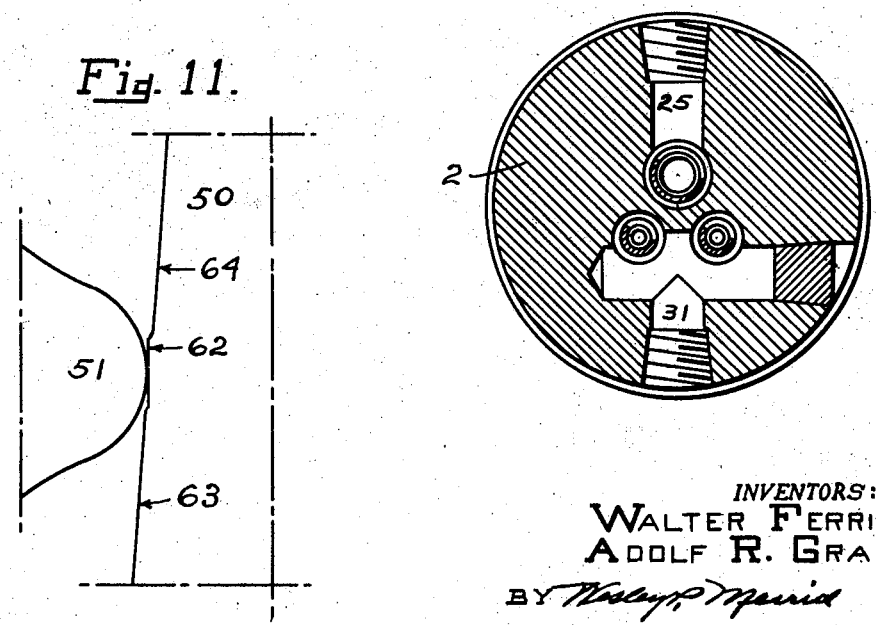
Fig. 11.
Fig. 8.
INVENTORS:
WALTER FERRIS
ADOLF R. GRAD
BY
ATTORNEY.

Aug. 20, 1946.  W. FERRIS ET AL  2,406,138
HYDRODYNAMIC MACHINE
Filed Jan. 14, 1942  6 Sheets-Sheet 2
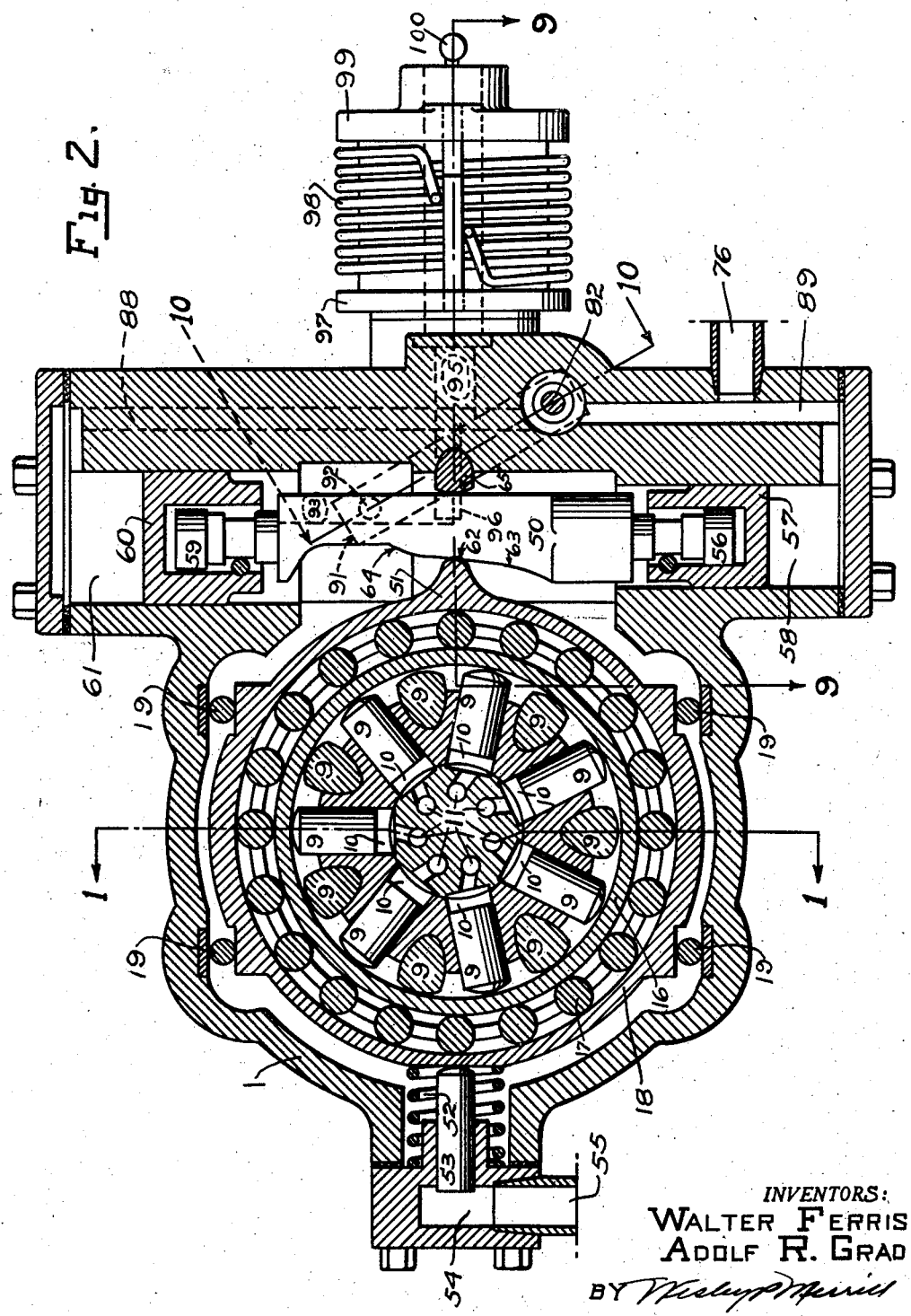
INVENTORS:
WALTER FERRIS
ADOLF R. GRAD
BY *Wesley Ferris*
ATTORNEY.

INVENTORS:
WALTER FERRIS
ADOLF R. GRAD
ATTORNEY.

Aug. 20, 1946.

INVENTORS:
WALTER FERRIS
ADOLF R. GRAD
BY
ATTORNEY.

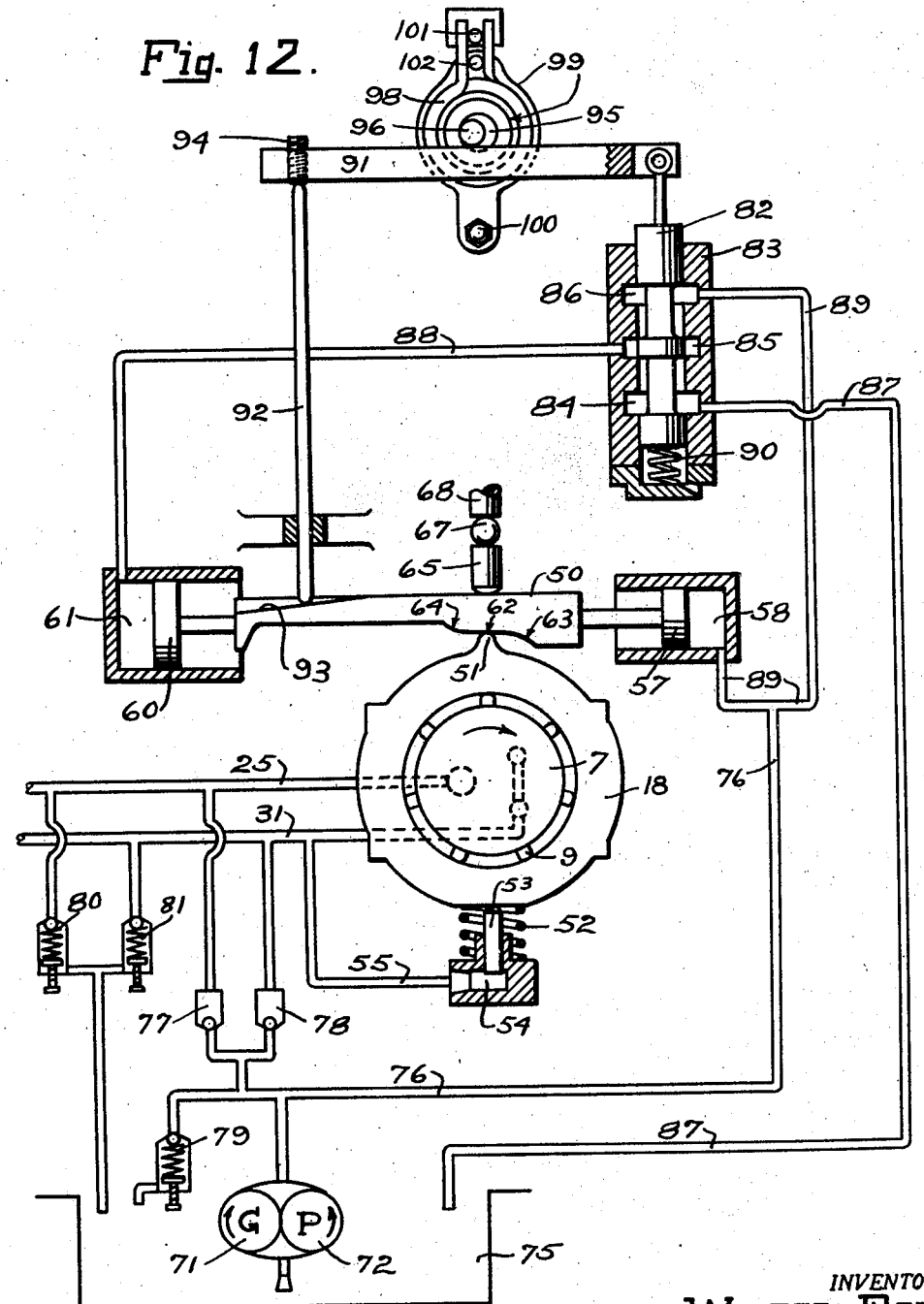

Aug. 20, 1946.    W. FERRIS ET AL    2,406,138
HYDRODYNAMIC MACHINE
Filed Jan. 14, 1942    6 Sheets-Sheet 6

INVENTORS:
WALTER FERRIS
ADOLF R. GRAD
BY
ATTORNEY.

Patented Aug. 20, 1946

2,406,138

UNITED STATES PATENT OFFICE 2,406,138

HYDRODYNAMIC MACHINE

Walter Ferris, Milwaukee, and Adolf R. Grad, Wauwatosa, Wis., assignors to The Oilgear Company, Milwaukee, Wis., a corporation of Wisconsin Application January 14, 1942, Serial No. 426,702

22 Claims. (Cl. 103—161)

This invention relates to hydrodynamic machines of the type which has cylinders arranged in a rotary cylinder barrel, a stationary valve having inlet and outlet ports with which each cylinder communicates alternately as the cylinder rotates, a piston fitted in each cylinder, and a reaction member arranged around the cylinder barrel in contact with the outer ends of the pistons and having its axis offset from the axis of the cylinder barrel when the machine is performing useful work. Such a machine will function as a pump when driven from a source of power or it will function as a motor when supplied with motive liquid.

One object of the invention is to provide a machine which is very small in size relative to its power capacity.

Another object is to greatly increase the number of pistons and cylinders without materially increasing the size of the cylinder barrel.

Another object is to provide a hydrodynamic machine of the rolling piston type with a cylinder barrel in which the pistons and cylinders are so arranged as to neutralize the axial components of the forces transmitted through the pistons.

Another object is to provide a hydrodynamic machine with a flat valve member having the passages so arranged therein that the bearing area of the valve member may be reduced to a minimum.

Another object is to provide means for preventing the high pressure liquid from lifting the flat valve member of a hydrodynamic machine from its seat particularly when the cylinder barrel is rotating at a low speed.

Another object is to provide a hydrodynamic machine with a control which in response to the application thereto of an external force will vary the displacement of the machine and which will automatically reduce the displacement of the machine to zero upon the external force being eliminated.

Another object is to provide a hydrodynamic machine in which the reaction member is constantly urged against a cam which is shiftable to permit or to cause the reaction member to move in one direction or the other and the path of the cam is positively determined by a roller bearing.

A hydrodynamic machine constructed according to the invention has the advantage of being positive and precise in operation and susceptible of extremely close adjustment and control.

Other objects and advantages will appear from the description hereinafter given of a hydrodynamic machine in which the invention is embodied.

Since the same hydrodynamic machine will function either as a pump or as a motor and since the function of a motor is the reverse of the function of a pump, the invention will be explained as applied to a pump in order to simplify the description but it is to be understood that the invention is equally applicable to a motor and that the invention is in no way limited by designating the machine as a pump.

The invention is exemplified by the hydrodynamic machine shown partly in detail and in part diagrammatically in the accompanying drawings in which the views are as follows:

Fig. 1 is a longitudinal section through a pump in which the invention is embodied, the view being taken on the irregular line 1—1 of Fig. 2.

Fig. 2 is a transverse section taken on the irregular line 2—2 of Fig. 1.

Figure 3:
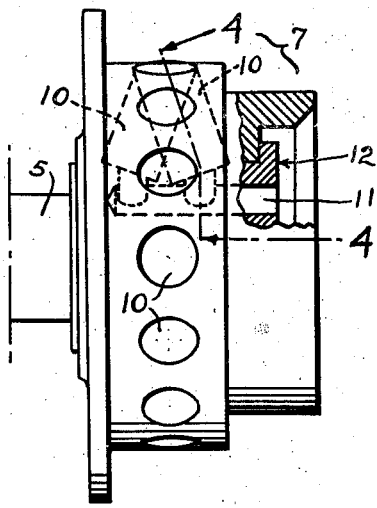
Fig. 3 is an elevation partly in section of the cylinder barrel of the pump.
Figure 4:
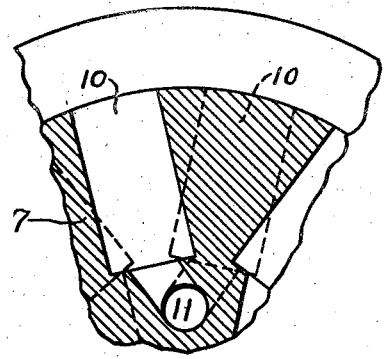
Fig. 4 is a section taken substantially on the irregular line 4—4 of Fig. 3.
Figure 7:
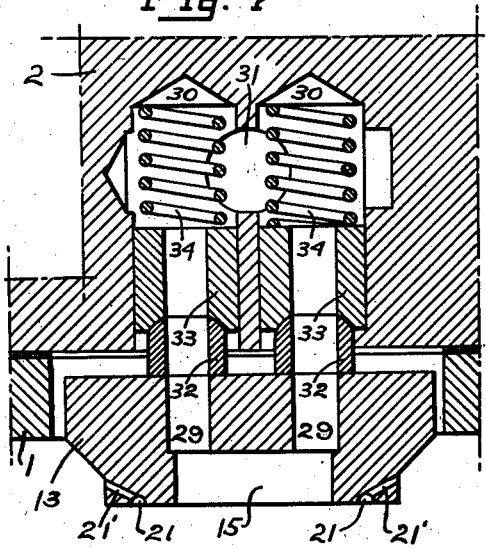
Figure 6:
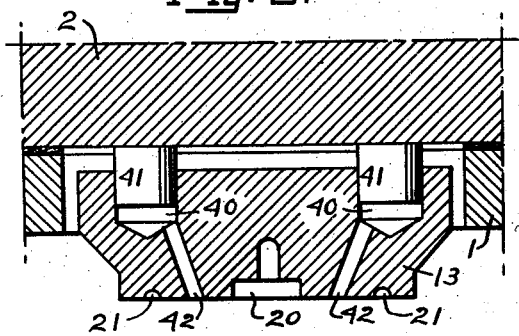
Figure 5:
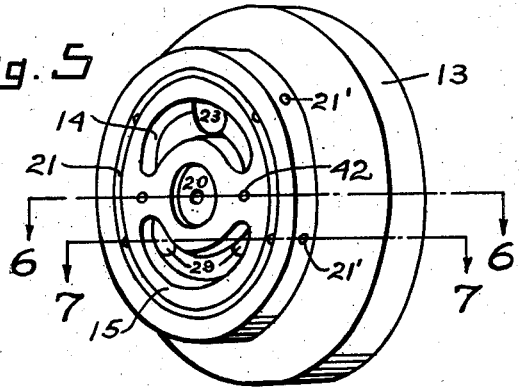
Fig. 5 is a perspective view of the valve member of the pump.

Figs. 6 and 7 are sectional plan views taken through the valve member and a part of the end head of the pump casing as indicated, respectively by lines 6—6 and 7—7 of Fig. 5.

Fig. 8 is a section taken on the line 8—8 of Fig. 1.

Figure 9:
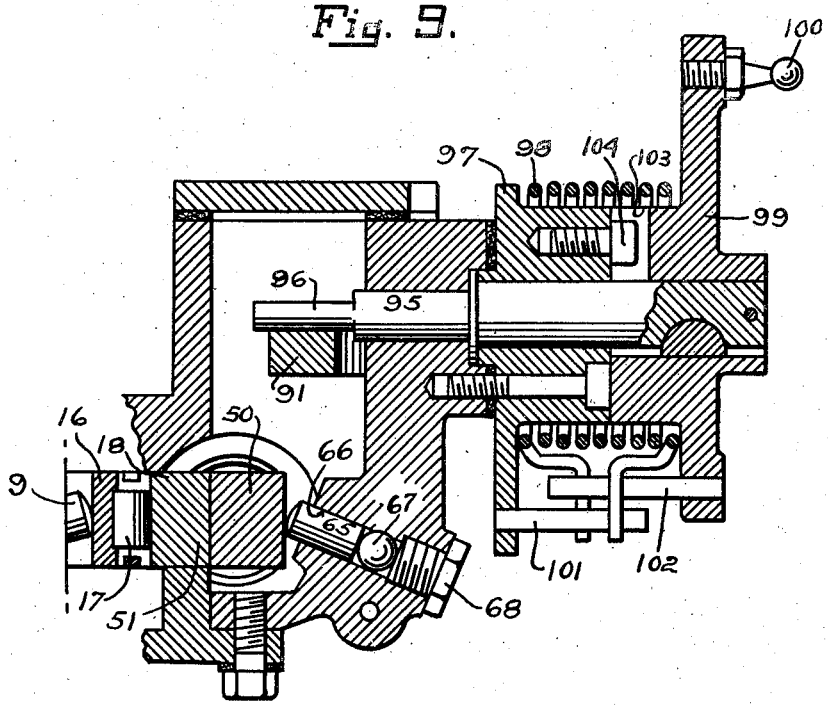

Fig. 9 is a sectional view showing a part of the pump control mechanism, the view being taken substantially on the line 9—9 of Fig. 2.

Figure 10:
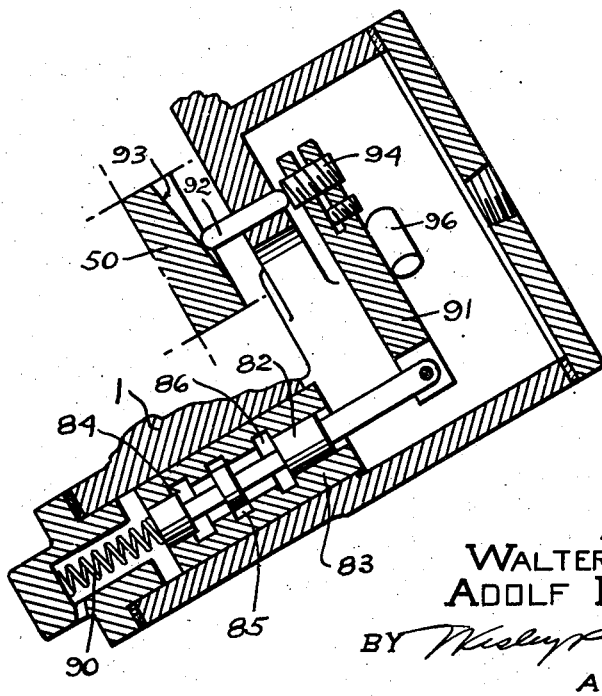

Fig. 10 is a sectional view showing another part of the pump control mechanism, the view being taken substantially on the line 10—10 of Fig. 2.

Fig. 11 is a view showing a detail of a cam for varying pump displacement.

Fig. 12 is a diagrammatic view showing the hydraulic circuit of the pump and illustrating the method of controlling pump displacement.

Figure 13:
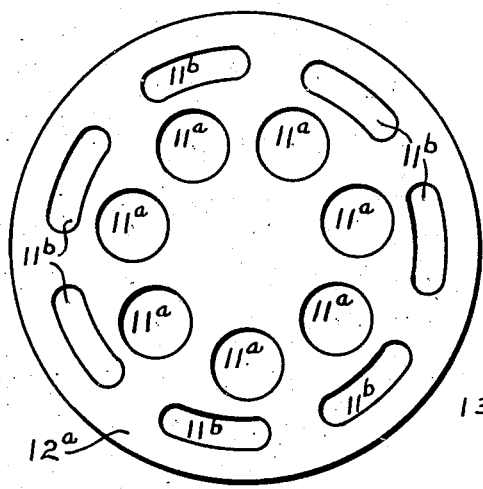
Figure 14:
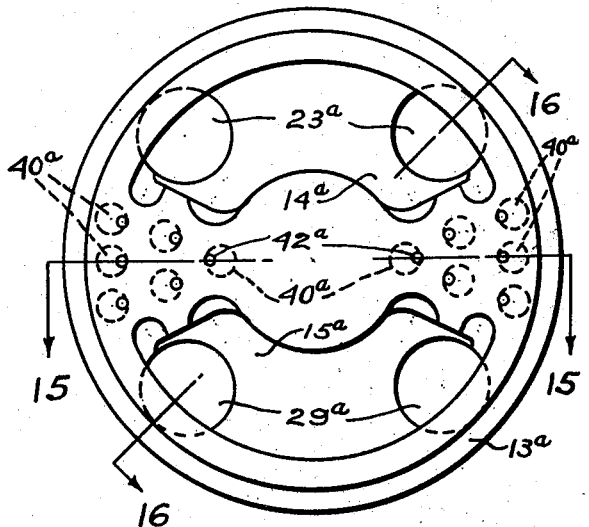

Figs. 13 and 14 are face views, respectively, of the valve seat and valve member of a hydrodynamic machine of larger capacity than the machine shown in Fig. 1.

Figure 15:
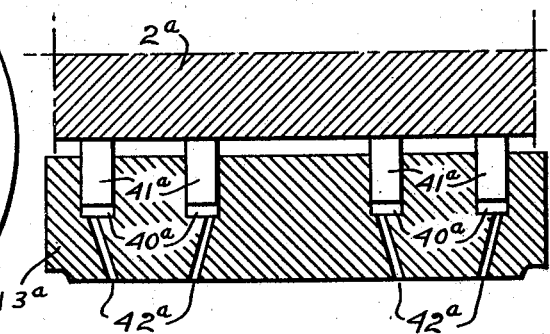

Fig. 15 is a section taken on the line 15—15 of Fig. 14.

Figure 16:
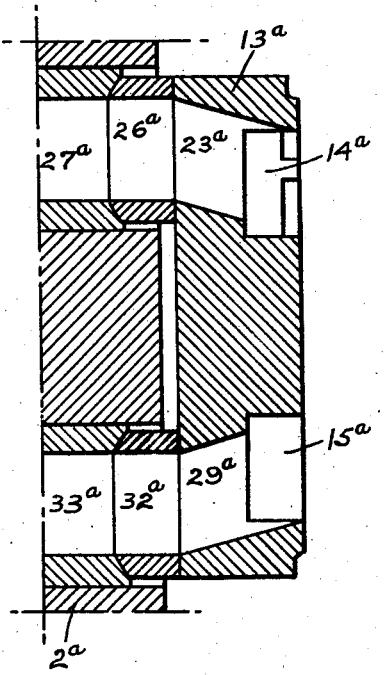

Fig. 16 is a section taken on the line 16—16 of Fig. 14.

The pump chosen for illustration has its pumping mechanism arranged within a casing 1 which is closed at its rear end by a rear head 2 and at its front end by a front head 3 having attached thereto a gland 4 through which a drive shaft 5 extends for connection to a source of power.

Shaft 5 has its front part journaled in a bearing 6 carried by front head 3 and its rear part fixed to a cylinder barrel 7 which is rotatably supported by a bearing 8 carried by casing 1. For convenience in manufacturing, the rear part of shaft 5 may be enlarged and firmly pressed into cylinder barrel 7 to form in effect a part thereof as shown but cylinder barrel 7 and the rear part of shaft 5 may be formed integral with each other and the front part of shaft 5 either formed integral therewith or connected thereto.

A piston 9 is fitted in each of a plurality of cylinders 10 which are formed in cylinder barrel 7 and communicate with a plurality of passages 11 formed in shaft 5 and extending through its rear end which forms a seat 12 for a flat faced valve 13 having two arcuate grooves or ports 14 and 15 formed therein. Passages 11 constitute cylinder ports each of which registers with valve ports 14 and 15 alternately as cylinder barrel 7 rotates and, in order that one cylinder port may not open to one valve port at the same instant that another cylinder port opens to the other valve port, an odd number of passages are provided. As shown, shaft 5 has seven passages 11 formed therein and each passage communicates with two adjacent cylinders 10 whose axes slope in opposite directions.

The outer ends of pistons 9 engage the inner face of a thrust ring 16 which, since the pump chosen for illustration is very small, has been shown as constituting the inner race of a roller bearing 17 the outer race of which is formed by the annular inner surface of a slide block 18, thereby saving the space that the inner and outer races of the roller bearing would ordinarily occupy. Ring 16 is restrained from axial movement by suitable flanges carried by cylinder barrel 7. Thrust ring 16, roller bearing 17 and slide block 18 constitute a reaction member for effecting reciprocation of pistons 9 when cylinder barrel 7 is rotated and the axis of thrust ring 16 is offset from the axis of cylinder barrel 7.

Slide block 18 may be supported upon slide plates according to the usual practice but it has been shown supported upon four rollers 19 which are arranged at its four corners and permit it to be moved transversely of the cylinder barrel axis to vary pump displacement but restrain it from vertical movement, axial movement of slide block 18 being prevented by casing 1 and front head 3. Slide block 18 constitutes one race for each roller 19 and thereby saves valuable space.

When cylinder barrel 7 is rotated, the friction between the outer ends of pistons 9 and ring 16 causes ring 16 to rotate substantially in synchronism with cylinder barrel 7. When slide block 18 is shifted from its neutral position so that the axis of ring 16 is offset from the cylinder barrel axis, each piston 9 will move progressively outward and draw liquid into its cylinder 10 during one half of each revolution of cylinder barrel 7 and it will move progressively inward and expel liquid from its cylinder during the other half of each revolution of cylinder barrel 7.

The distance between the outer end of each piston and the cylinder barrel axis thus constantly varies with a resultant variation in the linear speed of the outer end of each piston relative to the substantially constant speed of ring 16. In order to avoid sliding friction between ring 16 and the outer ends of pistons 9, cylinders 10 are inclined to the cylinder barrel axis and the outer end of each piston 9 is so shaped that it engages ring 16 upon a single spot which is offset at such a distance from the piston axis that the variation in the linear speed of the outer end of each piston relative to the speed of ring 16 causes the piston to rotate in its cylinder as it reciprocates therein.

In order to provide the maximum number of cylinders in a cylinder barrel of a given size, alternate cylinders are inclined in opposite directions in respect to the cylinder barrel axis. If all of the cylinders in a cylinder barrel were in the same plane, the inner ends could be arranged close together with only a wall of the necessary thickness between adjacent cylinders but the outer ends of the cylinders would be spaced far enough apart to provide sufficient space for another cylinder between each two adjacent cylinders. Therefore, by inclining alternate cylinders in opposite directions, approximately twice as many cylinders can be formed in the cylinder barrel.

Due to the distance between the outer end of each piston 9 and the axis of cylinder barrel 7 varying when cylinder barrel 7 is rotated and ring 16 is eccentric thereto, the outer end of each piston 9 has a small movement axially of ring 16 and, when pumping forces are being transmitted from ring 16 to the pistons, this movement causes cylinder barrel 7 to be subjected to a horizontal force which tends to move it axially and which may be designated as a horizontal frictional component of the pumping force. However, by inclining alternate pistons in opposite directions, the horizontal forces or components neutralize each other and consequently cannot cause axial movement of cylinder barrel 7.

When the machine is functioning as a pump, liquid under pressure will be discharged from cylinders 10 through one port 14 or 15 and liquid at a low pressure will be returned to cylinders 10 through the other port 14 or 15 and, when the machine is functioning as a motor, liquid under pressure will be delivered to cylinders 10 through one port 14 or 15 and liquid at a low pressure will be discharged from cylinders 10 through the other port 14 or 15.

Regardless of whether the machine functions as a pump or as a motor, the liquid in one of the valve ports is under a high pressure, the liquid in the other valve port is under a low, zero or negative pressure, minute quantities of liquid will escape from the high pressure port and spread over valve seat 12 and the face of valve 13 to form a lubricating film therebetween, the pressure prevailing in the high pressure port will extend into the lubricating film, and the pressure prevailing in one or both of the ports and in the film will tend to move the valve away from its seat.

Due to the pressure being very high in one valve port and very low or absent in the other valve port, the film pressure varies from a high pressure at the edge of the high pressure port to a low or zero pressure at the edge of the other port and to zero at the edge of the valve seat. Consequently, the center of pressure is not on the center of the valve but, if the pressure in the low pressure port is zero or negative, the center of pressure is near the center of a high pressure area which extends around the high pressure port or, if there is pressure in the low pressure port, there will be one center of pressure near the center of a high pressure area which extends around the high pressure port and another center of pressure near the center of a low pressure area which extends around the low pressure port.

However, the force exerted by the liquid in the low pressure area is ordinarily so small that it may be disregarded in the present explanation and only the high pressure area considered, it being understood that the center of high pressure is on one side of the cylinder barrel axis when one port is the high pressure port and on the other side of the cylinder barrel axis when the other port is the high pressure port.

In order to limit the area of the film into which pressure may extend, a recess 20 is formed in the face of valve 13 at the center thereof, a limit groove 21 is formed in the face of valve 13 between the periphery thereof and the outer edges of ports 14 and 15, and drain ducts 20' and 21' extend, respectively, from recess 20 and grooves 21 rearward through valve 13 so that liquid entering recess 20 and groove 21 may drain into casing 1. The area of valve face outside of groove 21 simply acts as a bearing area as there is no pressure in the film between it and seat 12.

In order that valve 13 may not be moved away from its seat 12 by the pressure in the valve port and in the lubricating film, it is urged toward its seat by a constant force and by forces which vary in accordance with variations in the pressure prevailing in the valve ports.

As shown in Figs. 1 and 5, port 14 communicates with a passage 23 which extends through valve 13 into alinement with a bore 24 formed in rear head 2 and communicating with a passage 25 which extends outward through rear head 2 for connection to an external circuit. A substantially fluid tight joint between passage 23 and bore 24 is provided by a thimble 26 having its front end forming a flat slidable joint with the rear face of valve 13 and its rear end forming a substantially spherical joint with a tubular hold-up piston 27 which is fitted in bore 24 and urged against thimble 26 by a spring 28 arranged in the rear end of bore 24. Passages 11, port 14, passage 23, thimble 26, the bore through piston 27, bore 24 and passage 25 form a channel for the flow of liquid between cylinders 10 and one side of an external circuit.

As shown in Figs. 5 and 7, port 15 communicates with two passages 29 each of which extends through valve 13 into alinement with a bore 30 formed in rear head 2 and communicating with a passage 31 which extends outward through rear head 2 for connection to an external circuit. A substantially fluid tight joint between each passage 29 and a bore 30 is provided by a thimble 32 having its front end forming a flat slidable joint with the rear face of valve 13 and its rear end forming a substantially spherical joint with a tubular hold-up piston 33 which is fitted in bore 30 and urged against thimble 32 by a spring 34 arranged in the rear end of bore 30. Passages 11, port 15, passages 29, thimbles 32, the bore through pistons 33, bores 30 and passage 31 form a channel for the flow of liquid between cylinders 10 and the other side of an external circuit.

Thimble 26 is held against valve 13 and piston 27 is held against thimble 26 by spring 28, each thimble 32 is held against valve 13 and each piston 33 is held against a thimble 32 by a spring 34, and valve 13 is held against its seat 12 by spring 28 and both of springs 34 so that valve 13 is constantly urged against its seat 12 a constant force which is proportional to the combined resistances of springs 28 and 34.

The pressure in bore 24 is the same as the pressure in port 14 and this pressure acts upon the end of piston 27 and causes it to urge valve 13 against its seat with a force which is proportional to and varies in accordance with variations in the pressure in port 14. The pressure in each of bores 30 is the same as the pressure in port 15 and this pressure acts upon the end of piston 33 and causes it to urge valve 13 against its seat with a force which is proportional to and varies in accordance with variations in the pressure in port 15.

Each hold-up piston and the bore in which it is fitted constitutes a hold-up motor and the several hold-up motors are so proportioned that, regardless of which of ports 14 and 15 is the high pressure port, the hold-up force applied to valve 13 exceeds the force tending to move it away from seat 12 by an amount which is great enough to hold valve 13 against seat 12 but is not great enough to cause an unnecessary frictional drag upon seat 12 during rotation thereof relative to valve 13.

The hold-up motors are so arranged that the force exerted by a hold-up motor or the resultant of the forces exerted by a group of hold-up motors on one side of the cylinder barrel axis is applied to the valve at a point which is approximately opposite the pressure center of the pressure area surrounding the valve ports on the same side of the cylinder barrel axis.

If a single hold-up motor or the same number of hold-up motors were arranged upon opposite sides of the cylinder barrel axis of a small machine, corresponding motors would necessarily be of the same diameter and it would be impossible to arrange them close enough together to apply the hold-up forces to the proper points on the valve without increasing the diameter of the valve and the valve seat to such an extent that the overall size of the machine would be materially increased and the frictional drag on the valve seat increased so much that the efficiency of the machine would be seriously impaired.

The present invention, however, provides a different number of hold-up motors of different diameters upon opposite sides of the cylinder barrel axis so that they may be arranged close together and the efficiency of the machine maintained while reducing overall dimensions to a minimum. While the machine has been shown provided with one hold-up motor on one side of the cylinder barrel axis and two smaller hold-up motors on the other side thereof, it is obvious that a greater number of hold-up motors could be provided, particularly in a machine of greater capacity, providing that a greater number were arranged upon one side of the axis than upon the other side thereof.

As best shown in Fig. 5, ports 14 and 15 are separated from each other at the ends thereof by valve areas which are generally known as bridges and provide seals between the two ports, that is, the length of each bridge is at least as great as the diameter of the cylinder ports which in this case are the ends of passages 11.

When the machine is performing work, high pressure prevails in the cylinder ports communicating with the high pressure valve ports and in the cylinder port which has just passed onto a bridge from the high pressure valve port but has not opened to the low pressure valve port, low pressure prevails in the cylinder ports communicating with the low pressure valve port and in the cylinder port which has just passed onto a bridge from the low pressure valve port but has not opened to the high pressure valve port, and the number of high pressure cylinder ports and the number of low pressure cylinder ports continuously vary as the cylinder barrel rotates. For example, in the machine shown there will be four high pressure cylinder ports and three low pressure cylinder ports at one instant and three high pressure cylinder ports and four low pressure cylinder ports at the next instant.

This variation in the number of high pressure cylinder ports causes the pressure area surrounding the high pressure valve port to vary between a minimum and a maximum and the center of pressure of that area to move radially. The pressure area is extended gradually by a cylinder port moving from the high pressure valve port onto one of the bridges and it is extended suddenly by a cylinder port moving from the other bridge into communication with the high pressure valve port. The pressure area is suddenly reduced by a cylinder port containing liquid under high pressure moving from one bridge into communication with the low pressure valve port and it is gradually reduced as the cylinder port moves off the other bridge into full registry with the high pressure valve port. Extending the pressure area on one or both bridges causes the center of pressure to move from the center of pressure of the minimum pressure area radially inward and also parallel to the axis of the bridges.

When the machine is operating at high speed, the size of the pressure area and the location of the center of pressure change so rapidly that properly located hold-up motors will hold the valve to its seat but if the machine is operating at low speed as when a motor is starting its load, the change in the pressure area and in the center of pressure causes the valve to be tilted or to be lifted from its seat so that liquid can escape from between the valve and its seat to such an extent that under certain circumstances the motor cannot start its load.

In order to prevent the valve from being tilted or lifted from its seat, the hold-up motors are so arranged that the force exerted by a single motor or the resultant of the forces exerted by a plurality of motors is applied to the valve at a point approximately opposite the center of pressure of the minimum pressure area and balancing motors are provided to compensate for increases in the pressure areas and shifts of the center of pressure toward one bridge or the other, the balancing motors being arranged behind the bridges and supplied with liquid through ducts which extend through the face of the valve.

If the machine is small and of the single phase type as shown in Figs. 1 to 12, a single balancing motor is arranged behind each of the bridges. As shown, a cylinder 40 (Fig. 6) is formed in valve 13 behind each of the bridges, a piston 41 is fitted in each cylinder 40 and bears against the front end of rear head 2, and a duct 42 extends from cylinder 40 through the face of the bridge. The outer ends of ducts 42 are usually located directly in the path of the cylinder ports but they may be offset therefrom.

As each cylinder port crosses a bridge, a pressure impulse is transmitted therefrom to the balancing motor behind that bridge through duct 42 either directly from the cylinder port or through the lubricating film on the bridge. The pressure impulse energizes the balancing motor and causes it to exert upon valve seat 13 a hold-up force in addition to the hold-up forces exerted thereon by the hold-up motors. As soon as the cylinder port passes beyond the end of duct 42, enough liquid can escape through duct 42 from the balancing motor to substantially deenergize it. Since extension of the pressure area and the shift of the center of pressure is due to the pressure in the cylinder ports acting upon the bridges, the balancing motors are energized and deenergized in synchronism with the changes in the center of pressure so that valve 13 is held firmly to its seat without excessive hold-up forces being exerted thereon.

The volumetric capacity of a machine of the type shown is ordinarily increased by adding additional rows of pistons 9 and cylinders 10 in which case the machine is ordinarily of the split phase type, that is, the cylinder ports are arranged in at least two concentric circular rows and the leading edges of the ports in one row are offset from the leading edges of the ports in the other row so that the cylinder ports open successively to the valve ports.

For example, such a machine may be provided with a valve seat $12^a$ which has a plurality of circular cylinder ports $11^a$ and a plurality of elongated cylinder ports $11^b$ formed therein in concentric circular rows as shown in Fig. 13, it being understood that valve seat $12^a$ is formed upon the end of the rotor of the machine in the same manner that valve seat 12 is formed upon the end of the rotor of the machine shown in Fig. 1. Ports $11^b$ are elongated in order to keep as small as possible the valve member $13^a$ with which valve seat $12^a$ coacts to control the flow of liquid to and from the pumping cylinders. Since valve $13^a$ is functionally the same as the valve 13 previously described, like parts have been indicated by like reference numerals with the exponent "$a$" added to the reference numerals applied to valve $13^a$.

Since the cylinder ports are arranged in two concentric rows, the valve ports $14^a$ and $15^a$ in valve $13^a$ are made wide enough to register with both rows of cylinder ports and the bridges between the valve ports are wider at their outer ends than at their inner ends and are so shaped as to completely cover each cylinder port as it centers upon a bridge.

Since valve $13^a$ is of substantial size, the same number of hold-up motors may be arranged upon opposite sides of its axis. As shown, valve $13^a$ has two passages $23^a$ extending therethrough from port $14^a$ and two passages $29^a$ extending therethrough from port $15^a$. Each passage $23^a$ communicates with one side of a hydraulic circuit through a hold-up motor of which only the tubular piston $27^a$ and the thimble $26^a$ have been shown, and each passage $29^a$ communicates with the other side of the circuit through a hold-up motor of which only the tubular piston $33^a$ and the thimble $32^a$ have been shown.

In a small machine the pressure areas and hold-up forces are small and a single balancing motor behind each bridge compensates satisfactorily for the variations in the high pressure area, but in a large machine with a single balancing motor behind each bridge the errors in compensation result in larger unbalanced forces, and in irregularities of movement which become conspicuous at low speeds. Therefore, a large size machine ordinarily has a plurality of balancing motors arranged behind each bridge and adapted to be successively energized and deenergized.

As shown, valve 13a has six balancing motors 40a—41a arranged behind each of its bridges, a duct 42a leads from each cylinder 40a through the face of valve 13a, one half of ducts 42a have the outer ends thereof arranged in the path of cylinder ports 11a and the other half of ducts 42a have the outer ends thereof arranged in the path of cylinder ports 11b.

The outer ends of ducts 42a are so spaced that each cylinder port registers first with one then with two and then with three ducts 42a and then passes out of registry with the ducts successively so that the hold-up motors 40a—41a are successively energized and then successively deenergized. Consequently, the forces exerted by the balancing motors upon valve 13a are varied at a rate which is approximately the same as the rate at which the high pressure area varies.

While only six balancing motors have been shown behind each bridge, a larger number are employed in large machines. In fact, a medium size machine ordinarily has ten balancing motors behind each bridge.

In order that the several parts of the hold-up motors and the balancing motors may be retained in position during assembly of the machine, rear head 2 and valve 13 are connected together to form a sub-assembly. As shown in Fig. 1, a rear head 2 has two pins 43 fixed therein upon opposite sides of its axis, the outer part of each pin 43 is provided with a suitable cannelure and arranged in a bore formed in valve 13, and valve 13 has fixed therein two dowels 44 each of which passes through the cannelure of a pin 43 and holds valve 13 and rear head 2 together but permits valve 13 to move slightly in an axial direction relative to rear head 2.

When slide block 18 is in its central or neutral position, thrust ring 16 is concentric with cylinder barrel 7 and rotation of cylinder barrel 7 will not cause reciprocation of pistons 9. When slide block 18 is shifted from its neutral position, thrust ring 16 will be eccentric to cylinder barrel 7 and rotation of cylinder barrel 7 will cause the pump to deliver liquid in a direction and at a rate determined by the direction and distance slide block 18 is offset from its neutral position. If cylinder barrel 7 is rotated in a clockwise direction, shifting slide block 18 toward the left in respect to Fig. 2 from its neutral position will cause pistons 9 to discharge through passages 11, port 14, passage 23, thimble 26, tubular piston 27, bore 24 and through passage 25 to one side of an external circuit and, shifting slide block 18 toward the right in respect to Fig. 2 from its neutral position will cause pistons 9 to discharge liquid through passages 11, port 15, passages 29, thimbles 32, tubular pistons 33, bores 30 and through passage 31 to the other side of an external circuit.

The mechanism for shifting slide block 18 may assume various forms but, as shown, slide block 18 is adapted to be moved toward the left and permitted to move toward the right in respect to Fig. 2 by a cam 50 which engages a contact member 51 fixed to or formed integral with slide block 18.

Contact member 51 is retained in engagement with cam 50 by a compression spring 52 which engages slide block 18 upon its opposite side and constantly urges it toward the right. Spring 52 has sufficient strength to hold contact 51 in engagement with cam 50 at all times and to move slide block 18 to its neutral position from its extreme position at the left in which movement of slide block 18 spring 52 is assisted by the thrust of pistons 9 against ring 16.

Since the strength of a compression spring decreases as it expands and since the movement of the slide block toward the right from its neutral position is opposed by the thrust of pistons 9 against thrust ring 16, spring 52 is assisted in moving slide block 18 toward the right from its neutral position by a piston 53 fitted in a cylinder 54 which is carried by casing 1 and connected by a channel 55 to passage 31 as shown in Fig. 12. The arrangement is such that, when cam 50 is shifted, spring 52 will move slide block 18 toward the right in respect to Fig. 2 until it has passed its neutral position and the pump discharges into passage 31 and then liquid under pressure will flow from passage 31 to cylinder 54 and cause piston 53 to assist spring 52 in moving slide block 18 farther toward the right.

As shown in Fig. 2, cam 50 has a head 56 formed upon one end thereof and arranged within a hollow piston 57 which is fitted in a cylinder 58 carried by casing 1, and a head 59 is formed upon the other end of cam 50 and arranged within a hollow piston 60 which is larger than piston 57 and fitted in a cylinder 61 carried by casing 1 in axial alignment with cylinder 58.

Cam 50 is ordinarily so shaped that, when contact 51 is in engagement with the mid-portion of cam 50, the movement of slide block 18 is slight relative to the movement of cam 50 but progressively increases as contact 51 engages points on cam 50 which are progressively farther from the mid-portion thereof. As shown, cam 50 has formed upon the face thereof a cam track consisting of a short central track section 62 (Fig. 11) which extends parallel to the path of the cam, a track section 63 which extends from one end of section 62 toward piston 57 and is inclined toward slide block 18, and a track section 64 which extends from the other end of section 62 toward piston 60 and is inclined away from slide block 18.

When cam 50 is in its neutral position as shown in Fig. 2, contact member 51 will be in engagement with track section 62 and slide block 18 will be in its neutral position so that pump displacement will be zero. When cam 50 is shifted upward in respect to Fig. 2, track section 63 will pass across contact 51 and move slide block 18 toward the left and thereby cause the pump to discharge liquid in one direction and to increase its rate during continued movement of cam 50. When cam 50 is shifted downward in respect to Fig. 2, track section 64 will pass across contact 51 and permit slide block 18 to move toward the right and thereby cause the pump to discharge liquid in the opposite direction and to increase its rate during continued movement of cam 50.

Since any power pump has as an inherent characteristic thereof a certain amount of slip or leakage and since in a pump of the type shown the rate of delivery is proportional to the distance its displacement varying member is moved from its neutral position, it is necessary that the displacement varying member be moved an appreciable distance from its neutral position before the pump can deliver liquid under pressure to an external circuit.

In order that the pump may deliver liquid to an external circuit as soon as track section 63 or 64 engages contact 51, the end of track section 63 rises abruptly from one end of track section 62 and the end of track section 64 drops abruptly away from the other end of track section 62 as shown in Fig. 11. The length of track section 62 and the drop from one section to another has been magnified in Fig. 11 for the purpose of illustration but in practice track section 62 is very short and in a small pump such as shown the drop from one track section to another is only a few thousandths of an inch as that amount of movement of slide block 18 is all that is necessary to cause the pump to supply liquid to compensate for leakage losses at a normal operating pressure.

In order that slide block 18 may be adjusted exactly to its neutral position and in order to protect pistons 57 and 60 from the transverse thrust exerted upon cam 50 by slide block 18, cam 50 is supported at a point opposite contact 51 and at least one of the pistons 57 or 60 is fitted loosely over the head on the end of cam 50. As shown in Fig. 2, head 59 is slightly smaller than the bore in piston 60 and a roller 65 is inclined to the plane of cam 50 and fitted in a bore 66 which is formed in casing 1 as shown in Fig. 9. One end of roller 65 is approximately spherical and engages the back of cam 50 at a point opposite contact 51 and the other end of roller 65 is flat and in engagement with a ball 67 which is arranged in bore 66 and held in engagement with roller 65 by a screw 68 threaded into casing 1.

When contact 51 is in engagement with cam track section 62, screw 68 is so adjusted that slide block 18 is held exactly in its neutral position so that the pump is at zero stroke, the clearance between head 59 and the interior of piston 60 compensating for any misalignment of parts and for any lateral movement of cam 50 necessary to move slide block 18 exactly to its neutral position.

When cam 50 is shifted in one direction or the other, roller 65 will rotate in cylinder 66 and provide an antifriction bearing for preventing any deflection of cam 50 and for relieving pistons 57 and 60 from the transverse thrust of slide block 18 against cam 50.

Liquid for supercharging the power pump and for enabling pistons 57 and 60 to shift cam 50 may be supplied from a gear pump shown in Fig. 1 as having its driven gear 71 fixed upon shaft 5 and its idler gear 72 journaled upon a shaft 73 carried by front head 3. Gears 71 and 72 are fitted in a suitable pump chamber which is formed in front head 3 and closed at its rear by a plate 74.

The gear pump draws liquid from a reservoir 75 (Fig. 12) and discharges it into a channel 76 which is connected to channels 25 and 31 through check valves 77 and 78, respectively, so that the power pump is supercharged by gear pump liquid regardless of the direction of pump delivery. The liquid discharged by the gear pump in excess of requirements is exhausted through a relief valve 79 which discharges into reservoir 75. The power pump is also provided with relief valves 80 and 81 which are connected, respectively, to channels 25 and 31 and permit the escape of liquid whenever the pressure created by the power pump exceeds a predetermined maximum.

The delivery of gear pump liquid to cylinder 61 is under the control of a pilot valve 82 (Figs. 2, 10 and 12) fitted in a valve casing 83 which is carried by the pump casing and provided with three annular grooves or ports 84, 85 and 86. Port 84 communicates with a drain channel 87 which discharges into reservoir 75, port 85 is connected by a channel 88 to cylinder 61, and port 86 communicates with a channel 89 which is connected to gear pump supply channel 76 and to cylinder 58 so that piston 57 is subjected to gear pump pressure at all times.

When pilot valve 82 is in its neutral position, it blocks port 85 so that no liquid can flow to or escape from cylinder 61 but a very slight movement thereof in one direction will open port 85 to port 84 so that liquid can escape from cylinder 61 and thereby permit the pressure in cylinder 58 to cause piston 57 to move cam 50 in one direction and a very slight movement of pilot valve 82 in the opposite direction will open port 85 to port 86 so that gear pump liquid can flow to cylinder 61 and cause piston 60 to move cam 50 in the opposite direction against the force exerted thereon by piston 57 which is smaller than piston 60.

The control for pilot valve 82 includes follow-up mechanism which transmits motion from cam 50 to valve 82 and tends to return it to its neutral position as fast as it is moved therefrom. As shown, valve 82 is constantly urged in one direction by a spring 90 and it is adapted to be moved in the opposite direction by a lever 91 having one end thereof pivoted to the stem of valve 82 and the other end thereof supported by a pin 92 which is guided in the pump casing and bears upon a cam track 93 formed upon cam 50, a screw 94 being threaded through the end of lever 91 into engagement with pin 92 for the purpose of adjusting lever 91 relative to cam track 93.

Lever 91 is operated by a shaft 95 journaled in casing 1 and having formed upon its inner end an eccentric 96 which engages lever 91 intermediate the ends thereof. Spring 90 urges lever 91 against eccentric 96 and causes adjusting screw 94 to bear upon pin 92 and pin 92 to bear upon cam track 93 so that there is no lost motion between these parts at any time.

Shaft 95 is also journaled in and restrained from axial movement by a spring retainer 97 which is fastened to casing 1. A torsion spring 98 is arranged around retainer 97 and around a hub 99 which is fixed upon the outer end of shaft 95 and provided with means for rotating it and shaft 95, hub 99 being shown provided with one part 100 of a ball and a socket joint by means of which it may be connected to a control device.

Spring 98 has its two ends arranged upon opposite sides of two pins 101 and 102 which are fixed, respectively, in retainer 97 and hub 99 parallel with each other so that when hub 99 is rotated in one direction or the other by an external force, pin 102 will move away from pin 101 and thereby cause the tension of spring 98 to be increased and, when the external force is removed, spring 98 will return hub 99 and shaft 95 to and yieldingly retain them in their neutral positions.

In order to limit the angular distance through which shaft 95 may be rotated, a recess 103 is formed in hub 99 and a stop bolt 104 is fixed in retainer 97 with its head arranged within recess 103 so that rotation of shaft 95 in either direction is limited by the head of bolt 104 engaging an end wall of recess 103.

The above described control will operate in the following manner, it being assumed that cylinder barrel 7 is being rotated in a clockwise direction in respect to Fig. 12 and that gear pump 71—72 is maintaining pressure in channel 76 and it being understood that in the following explanation directions are specified in respect to Fig. 12 and not in respect to any other figure or to the machine as actually employed in practice.

When shaft 95 is in its neutral position as shown, cam 50 and slide block 18 are in their neutral positions and pump displacement is zero. When shaft 95 is rotated in a counterclockwise direction from its neutral position, eccentric 96 will depress lever 91 which will pivot upon pin 92 and move valve 82 downward so that gear pump liquid can flow through valve casing 83 and channel 88 to cylinder 61. Since piston 60 is larger than piston 57, it will move cam 50 toward the right and cause piston 57 to expel liquid from cylinder 58 into channel 89.

Movement of cam 50 toward the right causes cam track 93 to move across the end of pin 92 so that, since pilot valve 82 and the right end of lever 91 are urged upward by spring 90, the left end of lever 91 moves progressively downward as cam 50 moves toward the right and valve 82 is kept depressed only during continued rotation of shaft 95. Consequently, valve 82 will be returned to its neutral position as soon as rotation of shaft 95 ceases.

Movement of cam 50 toward the right also causes cam track 62 to move out of engagement with contact 51 and cam track 64 to move across contact 51 so that spring 52 can move slide block 18 upward which will cause the pump to discharge liquid into passage 31. As soon as the pump creates pressure in passage 31, the pressure extends through channel 55 to cylinder 54 and causes piston 53 to assist spring 52 in moving slide block 18 upward to increase the displacement and delivery of the pump.

When shaft 95 is rotated in a clockwise direction, eccentric 96 will revolve upward and permit spring 90 to raise pilot valve 82 and the right end of lever 91, the left end of lever 91 continuing to press pin 92 against cam track 93 due to the action of the spring 90. Raising pilot valve 82 will connect channel 88 to drain channel 87 and thereby enable the gear pump liquid constantly supplied to cylinder 57 to move cam 50 toward the left and cause piston 60 to expel liquid from cylinder 61 through channel 88 and pilot valve casing 83 into drain channel 87.

Movement of cam 50 toward the left causes cam track 93 to move across the end of pin 92 and raise pin 92 and the left end of lever 91 so that pilot valve 82 is returned to its neutral position as soon as rotation of shaft 95 ceases.

If contact member 51 is in engagement with cam track 64, movement of cam 50 toward the left also causes cam track 64 to move across contact 51 and shift slide block 18 downward to reduce pump displacement. If contact 51 is in engagement with cam track 62, movement of cam 50 toward the left causes cam track 62 to move out of engagement with contact 51 and cam track 63 to move across contact 51. Cam track 63 in moving toward the left across contact 51 will shift slide block 18 downward and cause the pump to discharge into passage 25. Thereafter, continued rotation of shaft 95 will cause pump displacement to continue to increase until it reaches maximum and rotation of shaft 95 in a counterclockwise direction will cause cam 50 to move toward the right and reduce pump displacement as explained above.

When the rotative force is removed from shaft 95 after it has been rotated in one direction or the other, spring 98 will quickly rotate shaft 95 to and stop it in its neutral position and cause eccentric 96 to shift pilot valve 82 downward if cam 50 is at the left of its neutral position or to permit spring 90 to shift pilot valve 82 upward if cam 50 is at the right of its neutral position.

Shifting pilot valve 82 causes cam 50 to move toward its neutral position and cam track 93 to adjust the left end of lever 91 as explained above. When cam 50 reaches its neutral position, cam track 62 engages contact 51 and holds slide block 18 in its neutral position and pilot valve 82 will have been returned to its neutral position so that the liquid in cylinder 61 is trapped therein and holds cam 50 in its neutral position. If liquid should leak from cylinder 61 and permit cam 50 to start to move toward the left, cam track 93 will raise pin 92 and cause lever 91 to swing about eccentric 96 as a fulcrum and depress pilot valve 82 so that gear pump liquid will flow through valve casing 83 and channel 88 to cylinder 61 and cause piston 60 to return cam 50 to its neutral position.

The pump shown is ordinarily employed to energize a motor which is adapted to move its load to desired positions. In order that the speed of the motor may be varied at a rapid rate when the load is at a distance from a desired position and varied micrometrically when the load approaches a desired position, cam tracks 63 and 64 are so shaped that a given angular movement of shaft 95 results in a very small movement of slide block 18 when it is near its neutral position and results in a much greater movement of slide block 18 when it is farther from its neutral position. As shown, the slope of each cam track is non-uniform and is reduced to a minimum near the junction of the track with cam track 62.

The hydrodynamic machine illustrated and described herein may be modified in various ways without departing from the scope of the invention which is hereby claimed as follows:

1. In a hydrodynamic machine, the combination of a rotatable cylinder barrel having a plurality of cylinders arranged therein with the outer ends of said cylinders arranged approximately in a circular row and alternate cylinders in said row inclined in opposite directions in respect to the axis of said cylinder barrel to thereby reduce the space required for said cylinders, means for connecting each cylinder to opposite sides of a circuit alternately as said cylinder barrel rotates, a cylindrical reaction member encircling said cylinder barrel and arranged eccentric thereto when the machine is performing useful work, and a piston fitted in each cylinder and having the outer end thereof in contact with said cylindrical member to be reciprocated thereby during rotation of said cylinder barrel.

2. In a hydrodynamic machine, the combination of a rotatable cylinder barrel having a plurality of radial cylinders arranged therein with the inner ends of adjacent cylinders arranged close together in a staggered row, the cylinders whose inner ends are in the left side of said row being inclined outward toward the right end of said cylinder barrel and the cylinders whose inner ends are in the right side of said row being inclined outward toward the left end of said cylinder barrel so that said cylinders occupy a minimum amount of space, a piston fitted in each cylinder, a cylindrical reaction member encircling said cylinder barrel eccentric thereto to engage said pistons and effect reciprocation thereof during rotation of said cylinder barrel, and means for connecting each cylinder to opposite sides of a circuit alternately as said cylinder barrel rotates;

3. In a hydrodynamic machine, the combination of a rotor having passages extending inward from an end thereof, means for connecting each of said passages to opposite sides of a circuit alternately as said rotor rotates, a plurality of radial cylinders arranged in said cylinder barrel with the inner ends thereof arranged close together in a staggered row, alternate cylinders in said row being inclined in opposite directions in respect to the radii of said rotor and a portion of each cylinder outward from the inner end thereof being arranged between the adjacent cylinders so that all of said cylinders are arranged in a minimum amount of space, a piston fitted in each cylinder, and a cylindrical reaction member arranged around said rotor eccentric thereto to engage said pistons and effect reciprocation thereof during rotation of said rotor, said member engaging each piston upon a single spot which is offset far enough from the piston axis to cause the piston to rotate in its cylinder as it reciprocates therein.

4. In a hydrodynamic machine having its pistons and cylinders arranged in a rotatable cylinder barrel, a valve seat arranged upon said cylinder barrel and provided with ports which communicate with said cylinders, and means for reciprocating said pistons, the combination of a valve engaging said seat and provided upon opposite sides of its axis with valve ports with which each cylinder port communicates alternately as said cylinder barrel rotates, and a plurality of hold-up motors adapted to hold said valve against said seat and so arranged that a greater number of said motors are upon one side of the valve axis than upon the other side thereof so that said motors may be arranged close together.

5. In a hydrodynamic machine having a casing and pumping means arranged within said casing and including a valve seat having cylinder ports arranged therein, the combination of a valve engaging said seat and provided upon opposite sides of its axis with valve ports with which each cylinder port registers alternately during operation of said pumping means, an end head carried by said casing and provided with connections for connecting said valve ports to a hydraulic circuit, a plurality of hold-up cylinders so arranged in said end head that a greater number of said cylinders are upon one side of the valve axis than upon the other side thereof and each cylinder communicates with one of said valve ports and with one of said connections, and a piston fitted in each hold-up cylinder to urge said valve against said seat and having an axial bore to provide a passage for the flow of liquid between the valve port and the connection with which its cylinder communicates.

6. In a hydrodynamic machine having a casing and pumping means arranged within said casing and including a valve seat having cylinder ports arranged therein, the combination of a valve member engaging said seat and provided upon opposite sides of its axis with valve ports with which each cylinder port registers alternately during operation of said pumping means, an end member carried by said casing and provided with connections for connecting said valve ports to a hydraulic circuit, a plurality of hold-up motors for holding said valve member against said seat and for providing communication between said valve ports and said connections, connectors fixed to one of said members and associated with the other of said members, and means for retaining said connectors in association with said other member so that said members and said hold-up motors may be connected together to form a subassembly before being assembled with other parts of said machine.

7. In a hydrodynamic machine having a casing and pumping means arranged within said casing and including a valve seat having cylinder ports arranged therein, the combination of a valve member engaging said seat and provided upon opposite sides of its axis with valve ports with which each cylinder port registers alternately during operation of said pumping means, an end member carried by said casing and provided with connections for connecting said valve ports to a hydraulic circuit, a plurality of hold-up motors arranged in said end member for holding said valve member against said seat and for providing communication between said valve ports and said connections, a plurality of pins each having one end thereof fixed in one of said members and the other end thereof provided with a cannelure and extending into the other member, and dowels fixed in said other member and extending through said cannelures to connect said members together but permitting a slight axial movement therebetween.

8. In a hydrodynamic machine having its pistons and cylinders arranged in a rotatable cylinder barrel and a valve seat arranged upon said cylinder barrel and provided with a plurality of ports which communicate with said cylinders, the combination of a valve engaging said seat and provided with high and low pressure valve ports with which each cylinder port communicates alternately as said cylinder barrel rotates, a plurality of hold-up motors arranged behind said valve to urge it against said seat, at least one balancing motor for assisting said hold-up motors in urging said valve against said seat, and means for intermittently energizing and deenergizing said balancing motor in accordance with variations in the number and angular positions of cylinder ports communicating with said high pressure port.

9. In a hydrodynamic machine having its pistons and cylinders arranged in a rotatable cylinder barrel and a valve seat arranged upon said cylinder barrel and provided with a plurality of cylinder ports which communicate with said cylinders, the combination of a valve engaging said seat and provided with inlet and outlet ports and with bridges therebetween so arranged that each cylinder port registers with said inlet and outlet ports alternately as said cylinder barrel rotates and said bridges provide seals between said valve ports, a plurality of hold-up motors arranged behind said valve to urge it against said seat, and a balancing motor arranged behind at least one of said bridges to assist said hold-up motors in holding said valve against said seat, said valve having a duct leading from the face of said bridge to the balancing motor behind it so that said balancing motor is energized by pressure transmitted thereto through said duct from cylinder ports passing across said bridge.

10. In a hydrodynamic machine having its pistons and cylinders arranged in rotatable cylinder barrel and a valve seat arranged upon said cylinder barrel and provided with a plurality of cylinder ports which communicate with said cylinders, the combination of a valve engaging said seat and provided with inlet and outlet ports and with bridges therebetween so arranged that each cylinder port registers with said inlet and outlet ports alternately as said cylinder barrel rotates and said bridges provide seals between said valve ports, a plurality of hold-up motors arranged behind said valve to urge it against said seat, said hold-up motors being energized by liquid transmitted thereto from said valve ports so that the forces exerted upon said valve by said hold-up motors vary in accordance with variations in the pressures at said valve ports, and a balancing motor arranged behind each of said bridges to assist said hold-up motors in holding said valve against said seat, said valve having a duct leading from the face of each bridge to the balancing motor behind it so that said balancing motors are energized by pressure transmitted thereto through said duct from cylinder ports passing across said bridges.

11. In a hydrodynamic machine having its pistons and cylinders arranged in a rotatable cylinder barrel and a valve seat arranged upon said cylinder barrel and provided with a plurality of cylinder ports which communicate with said cylinders, the combination of a valve engaging said seat and provided with inlet and outlet ports and with bridges therebetween so arranged that each cylinder port registers with said inlet and outlet ports alternately as said cylinder barrel rotates and said bridges provide seals between said valve ports, a plurality of hold-up motors arranged behind said valve to urge it against said seat, and a plurality of balancing motors arranged behind each of said bridges to assist said hold-up motors in holding said valve against said seat, said valve having a duct leading from each hold-up motor through the face of the bridge and the outer ends of said ducts being so located that each cylinder port as it passes across a bridge communicates successively with a plurality of said ducts.

12. In a reversible pump having a displacement varying member shiftable in opposite directions from a neutral position to cause the pump to deliver liquid in either of two directions and to vary pump delivery from zero to maximum in either direction, the combination of means for constantly urging said displacement varying member in one direction, means for moving said member in the opposite direction against the action of said urging means, a servo-motor for assisting said urging means in moving said member in said one direction, and means for energizing said servo-motor only after said urging means has moved said member in said one direction beyond its neutral position.

13. In a reversible pump having a displacement varying member shiftable in opposite directions from a neutral position to cause the pump to deliver liquid to one side or the other of a hydraulic circuit and to vary pump displacement from zero to maximum in either direction of pump delivery, the combination of means for constantly urging said displacement varying member in one direction to cause said pump to discharge into the first side of said circuit, means for moving said member in the opposite direction against the action of said urging means, a servo-motor for assisting said urging means in moving said member in said one direction, and means for connecting said servo-motor to said first side of said circuit so that it will be energized only after said member has been moved in said one direction beyond its neutral position.

14. In a pump having a displacement varying member shiftable in opposite directions to vary pump displacement, the combination of a cam for moving said member in one direction and for limiting its movement in the opposite direction, a contact on said member, means for urging said member in said opposite direction and for holding said contact against the face of said cam, means for moving said cam in opposite directions selectively to effect movement of said member in opposite directions selectively, and a guide arranged opposite said contact and in engagement with the back of said cam to absorb the thrust imposed upon said cam by said member.

15. In a pump having a displacement varying member shiftable in opposite directions to vary pump displacement, the combination of a cam for moving said member in one direction and for limiting its movement in the opposite direction, a contact on said member, means for urging said member in said opposite direction and for holding said contact against the face of said cam, means for moving said cam in opposite directions selectively to effect movement of said member in opposite directions selectively, a roller arranged opposite said contact and inclined to the path of said cam, said roller having one end arcuate and in engagement with the back of said cam, means for rotatably supporting said roller, and means for preventing said roller from moving axially to thereby enable it to absorb the thrust imposed upon said cam by said member.

16. In a pump having a displacement varying member shiftable in opposite directions to vary pump displacement, the combination of a cam for moving said member in one direction and for limiting its movement in the opposite direction, a contact on said member, means for urging said member in said opposite direction and for holding said contact against the face of said cam, servo-motor means for moving said cam in opposite directions selectively to effect movement of said member in opposite directions selectively and including a stationary cylinder and a piston fitted in said cylinder and so connected to said cam that said cam may be adjusted relative to the axis of said piston, and a guide arranged opposite said contact and in engagement with the back of said cam to relieve said piston from the thrust imposed upon said cam by said member.

17. In a pump having a displacement varying member shiftable in opposite directions to vary pump displacement, the combination of a cam for moving said member in one direction and for limiting its movement in the opposite direction, a contact on said member, means for urging said member in said opposite direction and for holding said contact against the face of said cam, servo-motor means for moving said cam in opposite directions selectively to effect movement of said member in opposite directions selectively, a roller arranged opposite said contact and inclined to the path of said cam, said roller having one end arcuate and in engagement with the back of said cam, means for rotatably supporting said roller, means for moving said roller to and retaining it in an adjusted position to enable it to absorb the thrust imposed upon said cam by said member, said servo-motor means including a stationary cylinder and a piston fitted in said cylinder and so connected to said cam that said roller adjusting means may adjust said cam relative to the axis of said piston, and means for preventing said roller from moving axially to thereby enable it to absorb the thrust imposed upon said cam by said member.

18. In a pump having a displacement varying member shiftable in opposite directions to vary pump displacement, the combination of a cam for moving said member in one direction and for limiting its movement in the opposite direction, a cam track arranged upon said cam and including a neutral track section extending parallel to the path of said cam and a displacement varying section inclined to said path, means for urging said member in said opposite direction and for holding said contact against said cam track, and means for moving said cam in opposite directions selectively to move said cam track across said contact to effect movement of said member and thereby cause a variation in pump displacement, said cam being so formed that said cam track drops abruptly from one to the other of said track sections so that a slight movement of said cam from its neutral position will cause pump displacement to be increased an appreciable amount.

19. In a pump having a displacement varying member shiftable in opposite directions to vary pump displacement, the combination of means including a cam for effecting movement of said member in opposite directions selectively, servo-motor means for moving said cam in opposite directions selectively to effect movement of said member in opposite directions selectively, means for supplying motive fluid to said servo-motor means including a pilot valve shiftable from and to a neutral position to effect movement of said cam from and to its neutral position, a control operable by an external force from and to a neutral position for moving said valve from and to its neutral position, and spring means for returning said control to its neutral position upon removal of said external force.

20. In a pump having a displacement varying member shiftable in opposite directions to vary pump displacement, the combination of a cam for moving said member in one direction and for limiting its movement in the opposite direction, a contact on said member, means for urging said member in said opposite direction and for holding said contact against the face of said cam, servo-motor means for moving said cam in opposite directions selectively to effect movement of said member in opposite directions selectively, means for supplying motive fluid to said servo-motor means including a pilot valve constantly urged in one direction and shiftable from and to a neutral position to effect movement of said cam from and to its neutral position, a follow-up mechanism for transmitting motion from said cam to said pilot valve, a control associated with said follow-up mechanism and being operable by an external force from and to a neutral position to effect movement of said valve from and to its neutral position, and spring means for returning said control to its neutral position upon removal of said external force.

21. In a hydrodynamic machine having a member shiftable in opposite directions to vary the displacement of said machine, the combination of an element movable in opposite directions from a neutral position for effecting movement of said member in opposite directions, a control operable by an external force from and to a neutral position for effecting movement of said element, and spring means for returning said control to its neutral position upon removal of said external force.

22. In a hydrohynamic machine having an inlet and an outlet, the combination of a cylindrical reaction member, an annular cylinder barrel arranged within said member and having a plurality of radial cylinders arranged therein with the outer ends thereof arranged in a row extending around the periphery of said cylinder barrel, alternate cylinders in said row being inclined in opposite directions so that the inner ends thereof are arranged close together and form a double staggered row in the inner periphery of said cylinder barrel with sufficient wall thickness between adjacent cylinders, means for rotating said cylinder barrel, a piston fitted in each cylinder and engaging said member to be reciprocated thereby during rotation of said cylinder barrel, and means for connecting each cylinder with said inlet and said outlet alternately as said cylinder barrel rotates.

WALTER FERRIS.
ADOLF R. GRAD.